US006274649B1

United States Patent
Ott et al.

(10) Patent No.: US 6,274,649 B1
(45) Date of Patent: Aug. 14, 2001

(54) AQUEOUS BINDING AGENT DISPERSION FOR CATIONIC ELECTRO-DIPCOAT PAINT

(75) Inventors: Günther Ott; Hardy Reuter; Walter Jouck, all of Münster (DE); Thierry Herning, Tokyo (JP); Susanne Piontek; Ulrich Heimann, both of Münster (DE); Karl-Heinz Grosse-Brinkhaus, Nottuln (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/367,001

(22) PCT Filed: Jan. 30, 1998

(86) PCT No.: PCT/EP98/00493

§ 371 Date: Sep. 2, 1999

§ 102(e) Date: Sep. 2, 1999

(87) PCT Pub. No.: WO98/33835

PCT Pub. Date: Aug. 6, 1998

(30) Foreign Application Priority Data

Feb. 3, 1997 (DE) ................................ 197 03 869

(51) Int. Cl.$^7$ .............................. C08K 3/20; C08L 63/02
(52) U.S. Cl. ........................................... 523/404; 523/428
(58) Field of Search ..................................... 523/404, 428

(56) References Cited

U.S. PATENT DOCUMENTS

| | | |
|---|---|---|
| 3,975,346 | 8/1976 | Bosso et al. . |
| 4,104,147 | 8/1978 | Marchetti et al. . |
| 4,260,720 * | 4/1981 | Bosso et al. ........................ 528/109 |
| 4,268,542 | 5/1981 | Sakakibara et al. . |
| 4,724,254 | 2/1988 | Geist et al. . |
| 5,003,025 | 3/1991 | Dobbelstein et al. . |

FOREIGN PATENT DOCUMENTS

| | | |
|---|---|---|
| 1329291 * | 5/1994 | (CA) . |
| 0 256 020 | 12/1986 | (EP) . |
| 0 319 703 | 11/1988 | (EP) . |
| WO 84/02713 | 7/1984 | (WO) . |

OTHER PUBLICATIONS

J. Appl. Polym. Sci., vol. 46, No. 6, pp. 991–1000 (Oct. 25, 1992).

* cited by examiner

Primary Examiner—Robert Dawson
Assistant Examiner—D. Aylward

(57) ABSTRACT

The present invention relates to an aqueous binder dispersion for cathodic electrodeposition coatings obtained A) by reacting
  I. a precursor prepared at temperatures of from 120 to 180° C. from
    a) a diepoxide compound or a mixture of diepoxide compounds and
    b) an aromatic or aliphatic compound hydroxyl, carboxyl, phenol and/or thiol groups, or a mixture of such compounds with reaction of the phenolic hydroxyl groups with epoxide groups,
  II. with at least one organic amine or a mixture of organic amines at a temperature between 60 and about 130° C. to give an epoxide/amine adduct;
B) subsequently or simultaneously reacting at least one secondary hydroxyl group of the precursor with an unreacted epoxide group of the epoxide/amine adduct prepared in step A) at a temperatures of from about 110 to about 150° C.;
C) adding a crosslinking agent at a temperature of less than about 150° C.;
D) neutralizing the resulting binder from step A to C at a temperature of from about 90 to about 110° C.; and
E) dispersing the neutralized binder obtained in step A to D in water.

22 Claims, No Drawings

AQUEOUS BINDING AGENT DISPERSION FOR CATIONIC ELECTRO-DIPCOAT PAINT

BACKGROUND AND SUMMARY OF THE INVENTION

The present invention relates to an aqueous binder dispersion for cationic electrodeposition coatings based on modified epoxy resins, and to a process for the preparation and use of the dispersion.

Cationic electrodeposition coating is a common coating process, especially for priming, in which water-dilutable synthetic resins carrying cationic groups are applied to electroconductive elements with the aid of direct current.

The use of modified epoxy resins as binders for cationic electrodeposition coatings is known (U.S. Pat. Nos. 4,104, 147; 4,260,720; 395,364; 4,268,542).

The modified epoxy resins available hitherto for use in cationic electrodeposition coatings have only poor compatibility with aliphatic hydrocarbons, their elasticity is unsatisfactory, and they give films which cannot easily be overcoated and whose thickness should be further increased.

EP 0 256 020 discloses water-dilutable binders for cationic electrodeposition coatings. In order to prepare the binders, a diepoxide compound, if desired together with at least one monoepoxide compound, is converted to an epoxy resin in a polyaddition reaction carried out at from 100 to 195° C. which is initiated by an initiator which reacts in a monofunctional manner and carries either an alcoholic OH group, a phenolic OH group or an SH group, and the epoxy resin is subsequently modified by means of primary and/or secondary amines or salts thereof and/or the salt of a tertiary amine, a sulfide/acid or phosphine/acid mixture and, if desired, also with a polyfunctional alcohol, a polycarboxylic acid, a polysulfide or a polyphenol.

In order to reduce the viscosity, solvents here must be added before or during addition of the amines. Accordingly, the high solvent content and low solids content are disadvantageous. In particular, the addition of solvents before/during addition of the amines means that excess solvent must be removed again after completion of the preparation of the binder dispersion.

The object of the present invention is accordingly to develop novel binder dispersions based on modified epoxy resins which do not have the abovementioned disadvantages. In particular, the dispersions should have a low solvent content. In particular, the aim is to obviate the need for distillative removal of solvents after preparation of the dispersion.

DETAILED DESCRIPTION OF THE INVENTION

This object is achieved in accordance with the invention by an aqueous binder dispersion for cathodic electrodeposition coatings based on modified epoxy resins containing ammonium groups which is obtainable A) by reacting
  I. a precursor which can be prepared, preferably at temperatures of from 120 to 180° C., particularly preferably from 125 to 150° C., from
    a) a diepoxide compound or a mixture of diepoxide compounds and
    b) an aromatic or aliphatic compound, preferably containing hydroxyl, carboxyl, phenol and/or thiol groups, or a mixture of such compounds, with reaction of the phenolic hydroxyl groups with epoxide groups,
  II. with at least one organic amine or mixture of organic amines at a feed temperature which is reduced to between 60 and 130° C., preferably between 90 and 1150C, to give an epoxide/amine adduct,
B) subsequently or simultaneously reacting the secondary hydroxyl groups with epoxide groups of the epoxide/amine adduct prepared in step A) at temperatures of from 110 to 150° C., preferably at about 130° C., if desired with addition of a catalyst,
C) adding a crosslinking agent, preferably solvent-free, or a mixture of various crosslinking agents, at a temperature of<150° C., preferably 90–130° C.,
D) if necessary neutralizing the mixture, preferably by addition of acids, at temperatures of from 90 to 110° C., and
E) dispersing the mixture obtained in steps A to D in water.

The novel binder dispersions can be obtained from readily accessible starting materials and are distinguished by good compatibility with aliphatic hydrocarbons and high elasticity.

It has been found that the above reaction sequence enables the use of viscosity-reducing solvents to be substantially avoided, and that the resultant binder dispersions surprisingly have an excellent particle size and good sedimentation stability. In addition, it has been found, surprisingly, that the novel binders enable the preparation of aqueous dispersions having high solids contents of from 35 to 45% at the same time as adequately low viscosity.

A high solids content is desirable for economic reasons. For a given reactor size, it allows a high solids yield per production batch to be achieved or, in other words, the production costs per kg of solids can be reduced at high solids contents. However, the solids content cannot be increased to an unlimited extent, since the dispersion must remain of sufficiently low viscosity for the subsequent processing steps, such as, for example, filtration. Experience has shown that the upper limit is a flow viscosity of 25 seconds in a DIN 4 cup.

It is a routine matter to the person skilled in the art to modify the viscosity of an organic binder after it has been protonated by means of acid and dispersed in water. This means that the viscosity of the binder in its organic, non-aqueous state is not necessarily the same as the viscosity in its water-dispersed state. In electrodeposition coating binders, two extreme cases can be observed: High-viscosity resins can produce both low-viscosity and high-viscosity aqueous dispersions for a given solids content. This also applies to low-viscosity resins. The determining factors are of a complex nature and are generally not fully understood, even by the person skilled in the art. To this extent, the low viscosities of the novel binders with their relatively high solids contents were surprising.

Their use in cationic electrodeposition coatings results in the deposition of thick films which can be readily overcoated. It has been found that the use of component b results in both an increase in elasticity and an increase in the thickness of the deposited films.

Component a in precursor I can be any compound containing two reactive epoxide groups and having an epoxide equivalent weight of below 1000, particularly preferably below 500.

Particularly preferred epoxide compounds are polyphenol diglycidyl ethers prepared from polyphenols and epihalohydrins. Examples of polyphenols which can be employed are the following:

Very particularly preferably: bisphenol A and bisphenol F. Particularly preferably: 1,1-bis(4-hydroxyphenyl)-n-heptane. In addition, 4,4-dihydroxybenzophenone, bis(4- hydroxyphenyl)-1,1-ethane, bis(4-hydroxyphenyl)-1,1-isobutane, bis(4-hydroxy-tert-butylphenyl)-2,2-propane, bis (2-hydroxynaphthyl)methane, 1,5-dihydroxynaphthalene and phenolic novolak resins are also suitable.

Preferred epoxide compounds are diglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2 -propane.

It is also possible to use diglycidyl esters of polycarboxylic acids, such as, for example, oxalic acid, succinic acid, glutaric acid, terephthalic acid, 2,6-naphthalenedicarboxylic acid, dimerized linolenic acid, etc. Typical examples are glycidyl adipate and glycidyl phthalate.

Also suitable are hydantoin epoxides, epoxidized polybutadiene and diepoxide compounds obtained by epoxidation of an olefinically unsaturated alicyclic compound.

Component b of the precursor I can be an aromatic or aliphatic compound which contains a hydroxyl, carboxyl, phenol or thiol group, or a mixture of such compounds, and reacts in a monofunctional manner with respect to epoxide groups under the reaction conditions prevailing during the preparation of the novel modified epoxy resins.

Component b is preferably a compound of the general formula $R^1$—OH, where $R^1$ can have the following meaning:

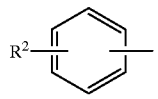

$R^2$=H, alkyl (preferably having 1 to 20 carbon atoms, particularly preferably t-butyl, nonyl or dodecyl), $R^3$ -O- (preferably in the p-position to the phenolic OH group), where $R^3$ =alkyl (preferably having 1 to 10 carbon atoms, particularly preferably methyl) or HO- (-$CHR^4CH_2$-O)$_n$-$CHR^4CH_2$-, where n=0–10 and $R^4$ =H or methyl, or a compound of the formula $R^5$-SH, where $R^5$ can have the following meaning:

$R^5$=alkyl (preferably having 1 to 20 carbon atoms, particularly preferably n-butyl or dodecyl), cycloalkyl (preferably cyclohexyl), aryl (particularly preferably phenyl) or aralkyl (particularly preferably benzyl), $R^6$-OOC-$CH_2$- or $R^7$-OOC-$CH_2CH_2$-, where $R^6$ and $R^7$=alkyl having 1 to 8 carbon atoms, preferably butyl or 2-ethylhexyl, or a mixture of such compounds.

Component b is preferably a monophenol, diphenol, for example bisphenol A, or a mixture of mono- and diphenols.

The reaction in step I is preferably carried out at from 120 to 180° C., preferably at from 125 to 150° C.

If necessary, a little solvent is used in this step. For this purpose, preference is given to xylene or a propylene glycol monoalkyl ether, such as propylene glycol methyl ether.

Through addition of catalysts, preferably phosphine or a phosphine derivative or phosphine salt, the reaction of components a and b can be controlled in such a way that only phenolic hydroxyl groups, but not secondary hydroxyl groups, react with epoxide groups. The secondary hydroxyl groups are formed in the reaction of components a and b. The phosphine used can be any desired phosphine containing no interfering groups. Examples of such phosphines are aliphatic, aromatic or alicyclic phosphines, specific examples of such phosphines which may be mentioned being the following: lower trialkylphosphines, such as trimethylphosphine, triethylphosphine, tripropylphosphine, tributyl phosphine, mixed lower alkylphenylphosphines, such as phenyldimethylphosphine, phenyldiethylphosphine, phenyldipropylphosphine, diphenylmethylphosphine, di phenylethylphosphine, diphenylpropylphosphine, tri phenylphosphine, alicyclic phosphines, such as tetra methyleneethylphosphine and the like. Particular preference is given to triphenylphosphine.

The selective conversion of the phenolic hydroxyl groups, which can be controlled in a targeted matter by, in particular, the addition of the catalysts mentioned, has the result that the mean molecular weight of the precursor is below 1500 g/mol, preferably below 1000 g/mol. This reduction in the molecular weight reduces the viscosity and at the same time means that the precursor can be cooled sufficiently.

The solids content of the precursor is $\geq$90% by weight, preferably 95–100% by weight.

In step II, primary, secondary or tertiary amines or their salts, or mixture of these compounds, can be added after or during reduction of the reaction temperature from step I. The temperatures are preferably from 60 to 130° C., preferably from 90 to 115° C.

The amine should preferably be a water-soluble compound. Examples of such amines are mono- and dialkylamines, such as methylamine, ethylamine, propyl amine, butylamine, dimethylamine, diethylamine, di propylamine, methylbutylamine and the like. Also suitable are alkanolamines, such as, for example, methylethanolamine, diethanolamine and the like. Furthermore suitable are dialkylaminoalkylamines, such as, for example, dimethylaminoethylamine, diethylamino propylamine, dimethylaminopropylamine and the like.

In most cases, low-molecular-weight amines are used, but it is also possible to use relatively high-molecular-weight monoamines.

Polyamines containing primary and secondary amino groups can be reacted with the epoxides in the form of their ketimines. The ketimines are prepared from the polyamines in a known manner.

The amines may also contain other groups, but these must not interfere with the reaction of the amine with the epoxide group nor result in gelling of the reaction mixture.

The charges which are necessary for water-dilutability and electrodeposition can be generated by protonation by means of water-soluble acids (for example boric acid, formic acid, lactic acid, propionic acid, butyric acid, carbonic acid or preferably acetic acid) or alternatively by reaction of the oxirane groups with salts of an amine or a sulfide/acid or phosphine/acid mixture.

The salt of an amine is preferably the salt of a tertiary amine.

The amine component of the amine/acid salt is an amine which can be unsubstituted or substituted, such as in the case of hydroxylamine, where these substituents must not interfere with the reaction of the amine/acid salt and the reaction mixture must not gel. Preferred amines are tertiary amines, such as dimethyl ethanolamine, triethylamine, trimethylamine, tripropyl amine and the like. Examples of other suitable amines are given in U.S. Pat. No. 3,839,252 in column 5, line 3, to column 7, line 42.

The amine/acid salt mixture is obtained in a known manner by reacting the amine with the acid.

The addition of the amines increases the molecular weight to above 1000 g/mol, preferably to between 1500 and 2000 g/mol. This also results in an increase in the viscosity, which can be compensated again through the subsequent temperature increase.

In step A), plasticizers and/or non-volatile diluents based on mono- or polyfunctional alcohols can, if desired, be added before or after addition of the amine. For example, polypropylene glycol compounds, such as Pluriol P 600, P 900, PE 3100 or Plastilit 3060 (all trademarks of BASF), can be used.

Compounds containing free epoxide groups are formed in step A). The epoxide equivalent weight can be between 200 and 2000 g/mol, preferably between 400 and 700 g/mol, of component A).

The epoxide groups remaining after step A) are reacted in step B), at elevated temperature, with secondary hydroxyl groups formed during the reaction of components a) and b). The reaction is preferably carried out at 110–150° C., particularly preferably at 130° C. If the temperature increase is not sufficient to reduce the viscosity, which likewise increases due to the increase in molecular weight, additional measures can be taken.

The reaction in step B) is preferably carried out in the presence of catalysts, particularly preferably in the presence of tertiary amino groups. However, separate addition is generally not necessary, since a catalyst of this type is introduced with the above-mentioned amines.

The binders prepared in accordance with the invention are treated with crosslinking agents in step C).

Suitable crosslinking agents are virtually all at least bifunctional compounds which react with hydroxyl groups, such as, for example polyalcohols, polyphenols, blocked polyisocyanates, phenolic resins and amino resins.

The crosslinking agents are generally employed in an amount of from 5 to 50% by weight, preferably from 25 to 40% by weight, based on the binder, and at a temperature of <150° C., preferably from 90 to 130° C.

Examples of suitable amino resin crosslinking agents are the hexamethyl ether of hexamethylolmelamine, the triethyl trimethyl ether of hexamethylolmelamine, the hexabutyl ether of hexamethylolmelamine, and the hexamethyl ether of hexamethylolmelamine and polymeric butylated melamine-formaldehyde resins. Alkylated urea-formaldehyde resins can also be used.

The crosslinking agents used are preferably blocked polyisocyanates. In the invention, any polyisocyanates can be used in which the isocyanate groups have been reacted with a compound in such a way that the blocked polyisocyanate formed is stable to hydroxyl groups at room temperature, but reacts therewith at elevated temperature, generally in the range from about 90 to about 300° C. The preparation of the blocked polyisocyanates can be carried out using any organic polyisocyanates which are suitable for the crosslinking. Preference is given to isocyanates containing from about 3 to about 36 carbon atoms, in particular from about 8 to about 15 carbon atoms. Examples of suitable diisocyanates are trimethylene diisocyanate, tetramethylene diisocyanate, penta methylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene di-isocyanate, 1,3-phenylene diisocyanate, 1,4-phenylene diisocyanate, 2,4-tolylene diisocyanate, 2,6-tolylene diisocyanate, 4,4'-diphenylene diisocyanate, 1,5-naphthylene diisocyanate, 1,4-naphthylene diisocyanate, 1-isocyanateomethyl-5-isocyanato-1,3,3-trimethylcyclohexan, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexene. It is also possible to use polyisocyanates of higher isocyanate functionality. Examples thereof are tris(4-isocyanatophenyl)methane, 1,3,5-triisocyanato-benzene, 2,4,6-triisocyanatotoluene, 1,3,5-tris(6-isocyanatohexylbiuret), bis(2,5- diisocyanato-4-methylphenyl)methane, and polymeric polyisocyanates, such as dimers and trimers of diisocyanatotoluene. It is also possible to use mixtures of polyisocyanate. The organic polyisocyanates which are possible crosslinking agents in the invention may also be prepolymers derived, for example, from a polyol, including a polyether polyol or polyester polyol.

The polyisocyanates can be blocked using any suitable aliphatic, cycloaliphatic or aromatic alkyl monoalcohols. Examples thereof aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols, such as cyclopentanol and cyclohexanol; and aromatic alkyl alcohols, such as phenylcarbinol and methylphenyl-carbinol.

Other suitable blocking agents are hydroxylamines, such as ethanolamine, oximes, such as methyl ethyl ketone oxime, acetone oxime and cyclohexanone oxime, or amines, such as dibutylamine and diisopropylamine. Said polyisocyanates and blocking agents can also be used in suitable mixing ratios for the preparation of the partially blocked polyisocyanates described above.

In step A, Ib, polyfunctional alcohols or polycarboxylic acids can be added if desired. These preferably have a molecular weight of from 300 to 3500, in particular from 350 to 1000, and are preferably added in amounts of from 0 to 30% by weight, preferably from 2 to 10% by weight.

The polyols which are suitable for the invention include diols, triols and higher polymeric polyols, such as polyester polyols and polyether polyols.

The suitable polyalkylene ether polyols conform to the general formula:

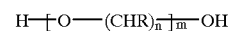

in which R=hydrogen or a lower alkyl radical, if desired with various substituents, n=2 to 6 and m=3 to 50 or more. Examples are poly(oxytetramethylene) glycols and poly(oxyethylene) glycols. Further polyalkylene glycols which can be used in accordance with the invention are polyethylene glycols and polypropylene glycols, for example polypropylene glycol phenyl ether.

The preferred polyalkylene ether polyols are poly(oxytetramethylene) glycols having a molecular weight in the range from 350 to 1000.

Polyester polyols can likewise be used as polymeric polyol component in the invention. The polyester polyols can be obtained by polyesterfication of organic polycarboxylic acids or their anhydrides using organic polyols containing primary hydroxyl groups. The polycarboxylic acids and the polyols are aliphatic or aromatic dicarboxylic acids and diols.

The diols used to prepare the polyesters include alkylene glycols, such as ethylene glycol, butylene glycol, propylene glycol, neopentyl glycol and other glycols, such as cyclohexanedimethanol.

The acid component of the polyester primarily consists of low-molecular-weight carboxylic acids or their anhydrides having 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid, maleic acid and glutaric acid. Instead of these acids, it is also possible to use their anhydrides, if they exist.

It is also possible to use polyester polyols derived from lactones in the invention. These products are obtained by reacting an ε-caprolactone with a polyol. Such products are described in U.S. Pat. No. 3,169,945.

The polylactone polyols obtained by this reaction are distinguished by the presence of a terminal hydroxyl group and by recurring polyester units derived from the lactone. These recurring moieties can conform to the formula.

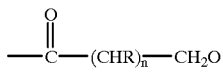

in which n is at least 4, preferably from 4 to 6, and the substituent is hydrogen, an alkyl radical, a cycloalkyl radical or an alkoxy radical.

In a further advantageous embodiment of the invention, long-chain dicarboxylic acids are used. Examples 10 thereof are dimeric fatty acids, such as, for example, dimeric linoleic acid.

Other polyphenols which are suitable in accordance with the invention conform to the general formula (I)

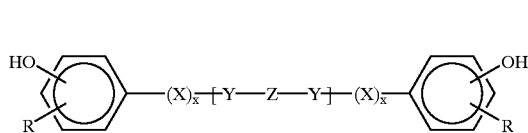

This component can advantageously be prepared, for example, in the following way. One mole of a high-molecular-weight diol, for example a polyester diol, a polycaprolactone diol, a polyether diol, a poly carbonate diol or the like, is esterified using two moles of a hydroxyphenylcarboxylic acid or reacted with two moles of a hydroxyphenylcarboxylic ester. Suitable hydroxycarboxylic acids are p-hydroxybenzoic acid, p-hydroxyphenylacetic acid and 3-(4-hydroxyphenyl) propionic acid or their esters. If the hydroxyphenyl group is attached by transesterification, it is also possible to carry out a basic transesterification using the alkali metal phenoxide of the corresponding hydroxyphenylcarboxylic ester. After the end of the reaction, the product must be worked up under acidic conditions to give the desired polyphenol.

For direct esterification, it is also possible to use, for example, N-(4-hydroxyphenyl)glycine. In a further variant, any desired acidic polyesters can be reacted with p-hydroxyaniline to give the desired polyphenols.

In another advantageous embodiment, polyether diamines or similar polyamines are reacted with, for example, 4-hydroxy-3-methoxybenzaldehyde to give the polyphenols.

Finally, a neutralization can be carried out in step D). This is preferably effected by addition of acids at from 90 to 110° C.

Finally, in step E), the mixture obtained in steps A) to D) is dispersed with addition of water. In another embodiment, it is also possible to add the neutralization acid in water and to disperse the resin mixture in the acidified water. The particle size of the disperse phase is 30–1000 nm, preferably from 50 to 180 nm.

Generally conventional additives, for example, coalescing solvents, pigments, surfactants, cross linking catalysts, antioxidants, fillers and antifoams, may be added to the aqueous coating compositions prepared using the novel binders.

The aqueous systems prepared with the aid of the binders according to the invention are particularly suitable for the cationic electrodeposition coating process; however, they can also be employed in conventional coating processes. Examples of coating substrates which can be used are optionally pre-treated metals, such as iron, steel, copper, zinc, brass, magnesium, tin, nickel, chromium and aluminum, but also impregnated paper and other electroconductive substrates.

The binders according to the invention are also suitable for the preparation of pigment pastes, i.e. the binders can also be employed as grinding resin.

On use of the resin according to the invention as grinding resin for the preparation of a pigment paste, the mixing ratios of the epoxy-containing organic material and of the organic tertiary amine which are reacted with one another are preferably selected in such a way that the base resin contains from 0.8 to 2.0 nitrogen atoms per molecule. Smaller amounts of quaternary nitrogen may result in poor wettability of the pigments, whereas higher amounts result in the resins becoming too water-soluble.

Pigment pastes according to the invention are prepared by comminuting or dispersing a pigment in the grinding resin in a well-known manner. The pigment paste contains, as essential constituents, the grinding resin and at least one pigment.

In addition, however, other conventional additives, such as plasticizers, wetting agents, surfactants or antifoams, may also be present in the pigment composition.

The pigments are generally ground in ball mills, sand mills, Cowles mills and continuous grinding units until the pigment has been comminuted to the desired particle size and has preferably be wetted by the resin or dispersed therein. After the comminution, the particle size of the pigment should be in the region of 10 μm or less. In general, comminution is continued to a Hegman fineness of from about 6 to 8. The grinding is preferably carried out in an aqueous dispersion of the grinding resin. The amount of water present in the mass to be ground should be sufficient to form a continuous aqueous phase.

The pigment used in the invention can be the well-known pigments. In general, titanium dioxide is the only or the principal white pigment. Other white pigments or extenders, such antimony oxide, zinc oxide, basic lead carbonate, basic lead sulfate, barium carbonate, porcelain, clay, calcium carbonate, aluminum silicate, silicon dioxide, magnesium carbonate and magnesium silicate, can, however, also be used. Examples of colored pigments which can be used are cadmium yellow, cadmium red, carbon black, phthalocyanine blue, chromium yellow, toluidine red and hydrated iron oxide. For further general information on the comminution of pigments and the formulation of paint compositions, reference is made to the following books:

1) D. H. Parker, Principles of Surface Coating Technology, Interscience Publishers, New York (1965)
2) R. L. Yates, Electropainting, Robert Draper Ltd., Teddington England (1966),
3) H. F. Payne, Organic Coating Technology, Volume 2, Wiley and Sons, New York (1961).

The invention is described in greater detail in the examples below. All parts and percentage data are by weight, unless expressly stated otherwise.

EXAMPLES

1. Crosslinking agent 1084 g of isomers and more highly functional oligomers based on 4,4'-diphenylmethane diisocyanate having an NCO equivalent weight of 135 (Basonat$^R$ A270, BASF; NCO functionality about 2.7; content of 2,2'- and 2,4'-diphenylmethane diisocyanate less than 5%) are introduced, under a nitrogen atmosphere, into a reactor fitted with a stirrer, reflux condenser, internal thermometer and inert-gas inlet. 2 g of dibutyltin dilaurate are added, and 1314 g of butyldiglycol are added dropwise at such a rate that the product temperature remains below 70° C. Cooling may be necessary. When the addition is complete, the temperature is kept at 70° C. for a further 120 minutes. In the subsequent check, NCO groups were no longer detectable The mixture is cooled to 65° C.

The solids content is >97% (1 h at 130° C.).

2. Preparation of the low-solvent aqueous binder dispersion containing a cathodically depositable synthetic resin and a crosslinking agent 2.1 Binder dispersion A 1128 parts of a commercially available epoxy resin based bisphenol A having an epoxide equivalent weight (EEW) of 188, 262 parts of dodecylphenol, 31.4 parts of xylene and 228 parts of bisphenol A are introduced into a laboratory reactor heated by means of heat-exchange medium and fitted with stirrer, reflux condenser, thermometer and inert-gas inlet, and heated to 127° C. under nitrogen. 1.6 g of triphenylphosphine are added with stirring, whereupon an exothermic reaction commences and the temperature rises to 160° C. The mixture is cooled again to 130° C. and the epoxide content is then checked. The EEW of 532 indicates that >98% of the phenolic OH groups have reacted. 297.5 parts of Pluriol P 900 (polypropylene glycol MW 900, BASF) are then added with simultaneous cooling. 5 minutes later, 105 parts of diethanolamine are added at 120° C. with further cooling. When, after brief exothermicity ($T_{max}$ 127° C.), the temperature has dropped to 110° C. (30 minutes), 51 parts of N,N-dimethylaminopropylamine are added. After brief exothermicity ($T_{max}$ 140° C.), the batch is allowed to react further at 130° C. for 2 hours until the viscosity remains constant (1.8 dpas, plate-and-ball viscometer at 23° C., 40% strength in Solvenon PM (BASF)). 58.5 parts of butyl glycol and 887.8 parts of the crosslinking agent (Example 1) are then added with simultaneous cooling, and the product is discharged at 105° C.

2100 parts of the still-hot mixture are immediately dispersed in a mixture of 1945 parts of demineralized water and 33.1 parts of glacial acetic acid with vigorous stirring. After brief homogenization, the mixture is diluted with a further 1404 parts of demineralized water and filtered through a Seitz K900 plate filter. The dispersion has the following properties:

Solids content (1 hour at 130° C.): 35.7%

MEQ base=0.657 meq/g of solid resin

MEQ acid=0.283 meq/g solid resin pH=5.4

Mean particle size=1250 Å (light scattering method)

Sedimentation stability=no sediment after storage for 3 months at room temperature Viscosity=14 sec. (DIN 4 cup at 23° C.)

2.2 Binder dispersion B

Binder dispersion B is prepared by the method described in Example 2.1 from the starting materials listed below:

Resin batch 1128 parts of epoxy resin (based on bisphenol A, EEW 188)

108 parts of p-cresol 28.4 parts of xylene 228 parts of bisphenol A 1.5 parts of triphenylphosphine (EEW=479)

228.8 parts of Pluriol PE3100 (propylene oxide-ethylene oxide polyether, BASF)

105 parts of diethanolamine 61.2 parts of N,N-dimethylaminopropylamine interim viscosity =1.8 dPas (plate-and-ball viscometer at 23° C., 40% strength in Solvenom PM)

53.8 parts of butyl glycol 1001 parts of crosslinking agent (Example 1)

Dispersion 2057.6 parts of resin batch (described above)

1900.8 parts of demineralized water 41.6 parts of glacial acetic acid 1405.4 parts of demineralized water Properties of the dispersion:

Solids content (1 hour at 130° C.): 38.2%

MEQ base=0.731 meq/g of solid resin

MEQ acid=0.406 meq/g solid resin pH=5.7

Mean particle size=1200 Å (light scattering method)

Sedimentation stability=no sediment after storage for b 3months at room temperature Viscosity =13 sec. (DIN 4 cup at 23° C)

2.3 Binder dispersion C

Binder dispersion C is prepared by the method described in Example 2.1 from the starting materials listed below:

Resin batch 1128 parts of epoxy resin (based on bisphenol A, EEW 188)

228 parts of bisphenol A 94 parts of phenol 1.5 parts of triphenylphosphine (EEW =478)

156.7 parts of Plastilit 3060 (propylene glycol compound, BASF)

115.5 parts of diethanolamine 61.2 parts of N,N-dimethylaminopropylamine interim viscosity =1.7 dPas (plate-and-ball viscometer at 23° C., 40% strength in Solvenon PM)

97.6 parts of butyl glycol 812 parts of crosslinking agent (Example 1)

Dispersion 2400 parts of resin batch (described above)

2173 parts of demineralized water 49.3 parts of glacial acetic acid 2751.7 parts of demineralized water Properties of the dispersion:

Solids content (1 hour at 130° C.): 45.1%

MEQ base=0.822 meq/g of solid resin

MEQ acid=0.375 meq/g solid resin pH=5.9

Conductivity=2.7 mS/cm

Mean particle size=1450 Å (light scattering method)

Sedimentation stability=no sediment after storage for 2 months at room temperature Viscosity=22 sec. (DIN 4 cup at 23° C.)

Solvent content: 1.7% of butyl glycol (by gas chromatography)

3. Cationic, water-soluble grinding resins 3.1 Grinding resin A

A grinding resin is prepared in accordance with EP 505 445 B1, Example 1.3; for better handling, it is additionally neutralized and diluted with 2.82 parts of glacial acetic acid and 13.84 parts of demineralized water. The original solids content is thus reduced to 3.2 Grinding resin B A grinding resin containing blocked isocyanate groups and quaternary ammonium groups is prepared in accordance with DE-A 26 34 211, Example 2. The solids content of the resin is 87.6%. For better handling, this resin is diluted to 60% with a 1:1 mixture of water and butyl glycol.

4. Aqueous pigment pastes

Aqueous pigment pastes are prepared from the starting materials shown in the following table (Table 1) by the process described in EP 505 445 B1. Paste B describes the embodiment of a "lead-free" pigment paste.

TABLE 1

Aqueous pigment pastes

| | Pigment paste | | |
|---|---|---|---|
| | A | B | C |
| Grinding resin A | 27.30 | 25.00 | — |
| Grinding resin B | — | — | 25.17 |
| Kaolin | — | — | 12.71 |
| Basic lead pigment | 1.40 | — | 2.72 |
| Aluminum silicate | 7.60 | 6.00 | — |
| Carbon black, pelletized | 0.50 | 0.60 | 0.28 |
| Titanium dioxide | 33.35 | 38.10 | 21.73 |
| Dibutyltin oxide | 1.65 | 2.70 | 0.90 |
| Deionized water | 26.50 | 27.10 | 36.11 |

5. Preparation of the electrodeposition baths and deposition of coating films For testing as cathodic electrodeposition coatings, the aqueous binder dispersions described under point 2 and the pigment pastes shown in Table 1 are combined to give the dip coating baths shown in Table 2. The procedure is firstly to dilute the binder dispersion with deionized water and then to introduce the pigment paste with stirring. The values given correspond to parts by weight.

TABLE 2

Electrodeposition baths

| | Dip coating No. | | |
|---|---|---|---|
| | 1 | 2 | 3 |
| Binder dispersion A | 2006 | — | — |
| Binder dispersion B | — | 2135 | — |
| Binder dispersion C | — | — | 2160 |
| Pigment paste A | 637 | — | — |
| Pigment paste B | — | 603 | — |
| Pigment paste C | — | — | 405 |
| Deionized water | 2357 | 2263 | 2435 |

The electrodeposition baths are left to age for 3 days at room temperature with stirring. The films are deposited for 2 minutes at the applied voltage onto zinc-phosphated steel test panels connected as cathode without Cr(VI) rinsing in the pretreatment. The bath temperature is shown in Table 3.

The deposited films are rinsed with deionized water and baked for 15 minutes at 175° C. (object temperature).

The dip coatings are listed in Table 3 along with their physical and electrical data and the properties of the 10 cured films resulting thereon.

TABLE 3

| | Dip coating | | |
|---|---|---|---|
| | 1 | 2 | 3 |
| pH of the CDC bath | 5.67 | 5.8 | 6.28 |
| Conductivity of the CDC bath (mS/cm)[1] | 1.34 | 1.61 | 2.04 |
| Bath temperature (° C.) | 29 | 29 | 27 |
| Removal voltage (volts) | 380 | 350 | 280 |
| Deposition voltage (volts) | 220 | 220 | 200 |
| Properties of the cured film: | | | |
| Film thickness ($\mu$m) | 22 | 21 | 22 |
| Flow-out[2] | 1 | 2 | 1 |
| Crosslinking[3] | >100 | >100 | >100 |
| Impact indentation[4] | 40 | 80 | 100 |
| Erichsen cupping (mm) | 6.5 | 6 | 6.5 |
| Corrosion: creep (mm)[5] | 0.9 | 0.8 | — |

What is claimed is:
1. An aqueous binder dispersion for cathodic electrodeposition coatings prepared by a process comprising:
   A) reacting together
      I. a precursor prepared at temperatures of from about 120 to about 180° C. from
         a) a diepoxide compound or a mixture of diepoxide compounds, and
         b) an aromatic or aliphatic compound, having functionality selected from the group consisting of hydroxyl, carboxyl, phenol, and thiol groups, or a mixture of such compounds,
      in the presence of a catalyst selected from the group consisting of phosphine, a phosphine derivative and a phosphine salt;
      II. with at least one organic amine or a mixture of organic amines at a temperature between a bout 60 and about 130° C. to given an epoxide/amine adduct;
   B) subsequently or simultaneously reacting at least one secondary hydroxyl group of the precursor with an unreacted epoxide group of the epoxide/amine adduct prepared in step A) at a temperature of from about 110 to about 150° C.;
   C) adding a crosslinking agent at a temperature of less than about 150° C.;
   D) neutralizing the resulting binder from steps A to C at a temperature of from about 90 to about 110° C.; and
   E) dispersing the neutralized binder obtained in steps A to D in water,
   whereby the need for distillative removal of solvents after preparation of the dispersion is obviated.
2. A process for the preparation of an aqueous binder dispersion for cathodic electrodeposition coatings comprising:
   A) preparing a precursor at a temperature of from about 120 to about 180° C. from
      a) a diepoxide compound or a mixture of diepoxide compounds, and
      b) an aromatic or aliphatic compound, having functionality selected from the group consisting of hydroxyl, carboxyl, phenol, and thiol groups, or a mixture of such compounds,
      using a catalyst selected from the group consisting of phosphine, a phosphine derivative and a phosphine salt;
   B) reacting the precursor with at least one organic amine or mixture of organic amines at a temperature between about 60 and about 130° C. to give an epoxide/amine adduct;

C) subsequently or simultaneously reacting at least one secondary hydroxyl group of the precursor with an unreacted epoxide group of the epoxide/amine adduct prepared in step B) at a temperatures of from about 110 to about 150° C.

D) adding a crosslinking agent at a temperature of less than about 150° C.;

E) neutralizing the resulting binder from steps A to D at a temperature of from about 90 to about 110° C.; and F) dispersing the neutralized binder obtained in steps A to E) in water, whereby the need for distillative removal of solvents after preparation of the dispersion is obviated.

3. The aqueous binder dispersion as claimed in claim 1, wherein the preparation of the precursor further comprises adding one or more solvents.

4. The aqueous binder dispersion as claimed in claim 1, wherein component b employed in step I is selected from the group consisting of monophenols, diphenols, and mixtures thereof.

5. The aqueous binder dispersion as claimed in claim 1, wherein the precursor has a solids content of greater than about 90% by weight.

6. The aqueous binder dispersion as claimed in claim 1, wherein the resulting binder in step C) comprises from about 5 to about 50 parts by weight of crosslinking agent.

7. The aqueous binder dispersion as claimed in claim 1, wherein step C) further comprises adding from about 1% to about 30% by weight of polyfunctional alcohols or polycarboxylic acids having a molecular weight of from 300 to 3500 based on the solids content.

8. A cathodic electrodeposition coating comprising the aqueous binder dispersion of claim 1.

9. The aqueous binder dispersion of claim 1, wherein the precursor and organic amine are reacted together at a temperature of from about 90° C. to about 115° C.

10. The aqueous binder dispersion of claim 1, wherein the crosslinking agent of step C) is added at a temperature of from about 90° C. to 130°.

11. The aqueous binder dispersion of claim 6, wherein component b is bisphenol A.

12. The process of claim 2, wherein the precursor and organic amine are reacted together at a temperature of from about 90° C. to about 115° C.

13. The process of claim 2, wherein the crosslinking agent of step D) is added at a temperature of from about 90° C. to about 130° C.

14. The process of claim 2, wherein the precursor is prepared with addition of one or more solvents.

15. The process of claim 2, wherein the catalyst is triphenylphosphine.

16. The process of claim 2, wherein component b employed in step A) is selected from the group consisting of monophenols, diphenols, and mixtures thereof.

17. The process of claim 16, wherein component b is bisphenol A.

18. The process of claim 2, wherein the precursor is prepared at a solids content of greater than 90% by weight.

19. The process of claim 2, wherein step C) is carried out in the presence of a catalyst.

20. The process of claim 19, wherein the catalyst is a tertiary amine.

21. The process of claim 2, wherein the crosslinking agent in step D) comprises from about 5 to about 50 parts of the resulting binder by weight.

22. The process of claim 2, wherein step D) further comprises adding from about 1% to 30% by weight of polyfunctional alcohols or polycarboxylic acids having a molecular weight of from 300 to 3500 based on the solids content.

* * * * *